(12) United States Patent
Bindl

(10) Patent No.: US 10,779,483 B2
(45) Date of Patent: Sep. 22, 2020

(54) DISK SAW FELLING HEAD

(71) Applicant: Deere & Company, Moline, IL (US)

(72) Inventor: Reginald M. Bindl, Dubuque, IA (US)

(73) Assignee: DEERE & COMPANY, Moline, IL (US)

(*) Notice: Subject to any disclaimer, the term of this patent is extended or adjusted under 35 U.S.C. 154(b) by 228 days.

(21) Appl. No.: 15/984,941

(22) Filed: May 21, 2018

(65) Prior Publication Data

US 2019/0350144 A1 Nov. 21, 2019

(51) Int. Cl.
*A01G 23/091* (2006.01)
*B27B 5/10* (2006.01)
*A01G 23/081* (2006.01)

(52) U.S. Cl.
CPC ......... *A01G 23/091* (2013.01); *A01G 23/081* (2013.01); *B27B 5/10* (2013.01)

(58) Field of Classification Search
CPC ..... A01G 23/08; A01G 23/081; A01G 23/091
See application file for complete search history.

(56) References Cited

U.S. PATENT DOCUMENTS

| 4,593,733 | A | 6/1986 | Hamilton | |
|---|---|---|---|---|
| 5,794,674 | A * | 8/1998 | Kurelek | A01G 23/081 144/336 |
| 6,640,850 | B1 * | 11/2003 | Hicks | A01G 23/091 144/336 |
| 9,526,217 | B2 | 12/2016 | DiSabatino | |
| 10,448,583 | B2 * | 10/2019 | DiSabatino | A01G 23/091 |
| 10,470,380 | B2 * | 11/2019 | DiSabatino | A01G 23/091 |
| 2017/0094915 | A1 | 4/2017 | DiSabatino | |

FOREIGN PATENT DOCUMENTS

CN 204540200 U 8/2015

\* cited by examiner

*Primary Examiner* — Matthew Katcoff

(57) ABSTRACT

A disk saw felling head comprising a saw housing positioned between a disk saw and harvesting and bunching cylinders so as to provide visibility window laterally between a first mounting post and a second mounting post promoting visibility of a full width of a tree toward a cutting zone.

20 Claims, 8 Drawing Sheets

DISK SAW FELLING HEAD

FIELD OF THE DISCLOSURE

The present disclosure relates generally to a disk saw felling head.

BACKGROUND OF THE DISCLOSURE

A forestry machine includes a base machine and a disk saw felling head attached to the base machine to be manipulated and controlled thereby. The disk saw felling head is configured to fell trees and to accumulate them for subsequent collective deposition.

The disk saw felling head has a disk saw. The disk saw is rotatable to fell a tree, typically used to cut a tree trunk or vegetation from its roots. In some cases, the disk saw felling head has a harvesting arm to gather a newly felled tree, and a bunching arm to hold the newly felled tree on the head. A common configuration of a disk saw felling head places the disk saw-motor assembly with the motor in an upright position thereby providing little or no visibility of the tree(s) to be felled and/or no visibility of the area where the disk saw comes into contact with the tree. Current configurations are highly reliant on operator expertise and extensive experience with maneuvering the machine where the operator controls the vehicle despite these "blindspots".

Furthermore, the lack of visibility contributes to operator inefficiencies wherein the operator may not be able to keep count of trees felled, nor fully comprehend the depth the disk felling head must maneuver to completely cut a tree trunk or vegetation, or position the angle of the disk saw optimally to make a clean cut, for example. The following, in particular the disk saw-motor assembly for a disk saw felling head, addresses these issues.

SUMMARY OF THE DISCLOSURE

According to an aspect of the present disclosure, a disk saw felling head has a fore-aft dimension, a lateral dimension, and a vertical dimension such that the fore-aft dimension, the lateral dimension, and the vertical dimension are perpendicular to one another. The disk saw felling head comprises a frame comprising a spine, a saw housing, and a side accumulation pocket. The spine comprises a first mounting post and a second mounting post. The first and second mounting posts are configured for attaching the disk saw felling head to a base machine and spaced laterally apart from one another relative to the lateral dimension. The saw housing is positioned laterally between the first and second mounting posts relative to the lateral dimension. The side accumulation pocket is positioned between the first mounting post and the second mounting post relative to the lateral dimension, and could extend laterally beyond the second mounting post.

The disk saw felling head comprises a disk saw housed within the frame, a motor attached to the disk saw to rotate the disk saw about an axis of the disk saw, a harvesting arm attached pivotally to the frame to pivot relative thereto to move a felled tree into the side accumulation pocket, a harvesting cylinder operable to pivot the harvesting arm relative to the frame, a bunching arm attached pivotally to the frame to pivot relative thereto to hold the felled tree in the side accumulation pocket, and a bunching cylinder operable to pivot the bunching arm relative to the frame. The disk saw is partially exposed outside the frame in a cutting zone at a front of the disk saw felling head relative to the fore-aft dimension. The motor is positioned within the saw housing. The saw housing is positioned between the disk saw and the harvesting and bunching cylinders relative to the vertical dimension so as to provide a visibility window laterally between the motor housing and the first mounting post relative to the lateral dimension promoting visibility of a full width of a tree through the visibility window toward the cutting zone in a forward direction relative to the fore-aft dimension.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
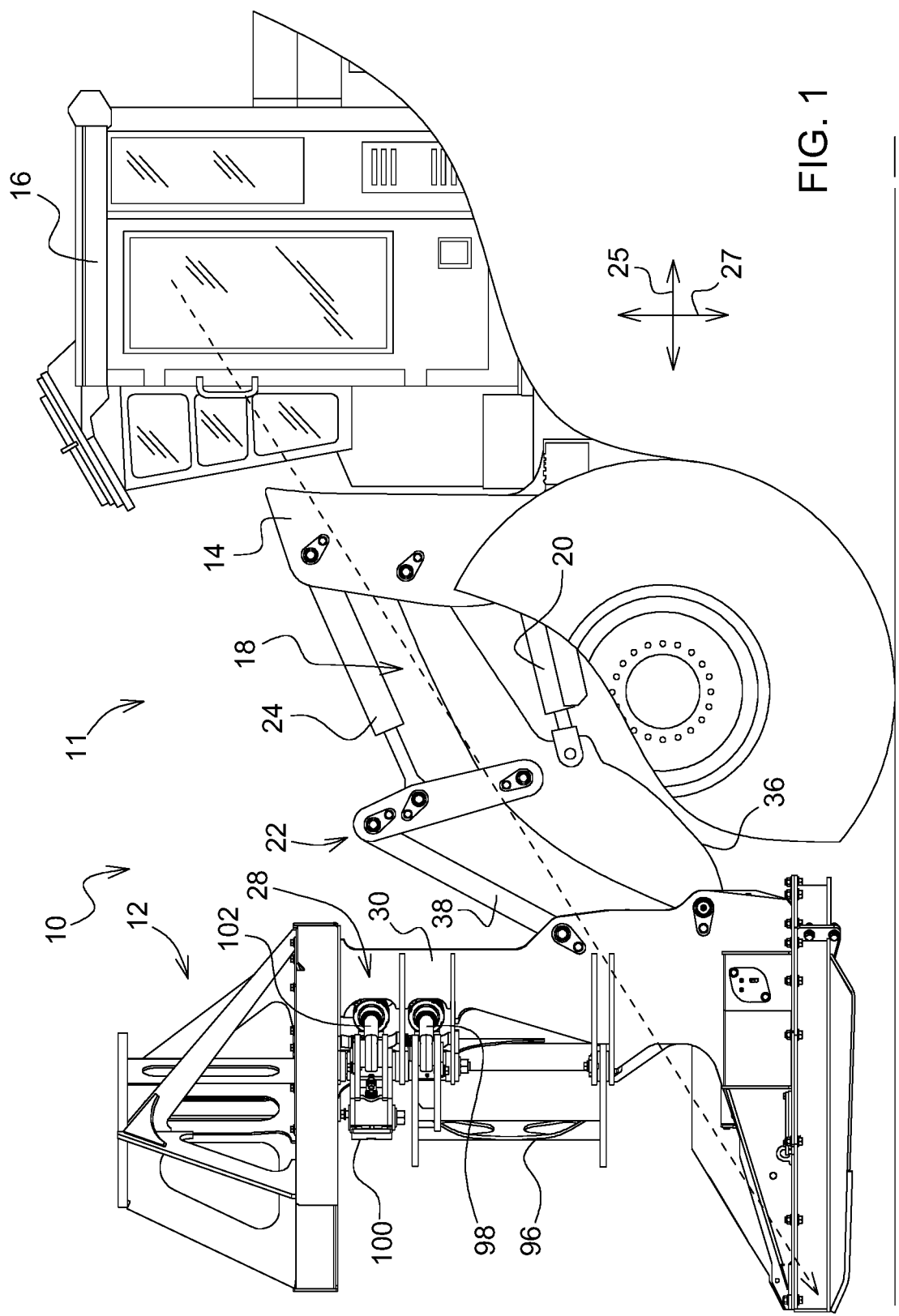
FIG. 1 is a side elevation view showing a simplified forestry vehicle including a base machine and a disk saw felling head attached to the base machine for manipulation thereby and showing a line of sight from the operator's station to a cutting zone of the disk saw felling head promoting visibility of a full width of a tree.

Referring to FIG. 1, there is shown a forestry vehicle 10 including a base machine 11 (e.g. wheeled base machine, tracked base machine, or some other ground supporting means) and a disk saw felling head 12 attached to the base machine 11 to be manipulated and controlled thereby. The disk saw felling head 12 is configured to fell a tree(s) and to accumulate them for subsequent collective deposition.

The base machine has a front frame 14, a rear frame (not shown), and an operator's station 16, a boom 18, a pair of hydraulic lift cylinders 20 (left and right, the left shown and representative of the right), a pivot linkage 22, and a pair of hydraulic pivot cylinders 24 (left and right, the left shown and representative of the right). The front frame 14 and the rear frame are articulated to one another for relative pivotable movement therebetween about an articulation axis. The operator's station 16 is mounted to the rear frame. The boom 18 attached pivotally to the front frame 14, and the head 12 is attached pivotally to the boom. The lift cylinders 20 are attached to the front frame 14 and the boom 18 to raise and lower the boom 18, and thus the head 12, relative to the front frame 14. The pivot linkage 22 is attached pivotally to the boom 18 and the head 12. The pivot cylinders 24 are attached to the boom 18 and the linkage 22 to pivot the linkage 22, and thus the head 12, forwardly and rearwardly relative to the boom 18.

Figure 3:
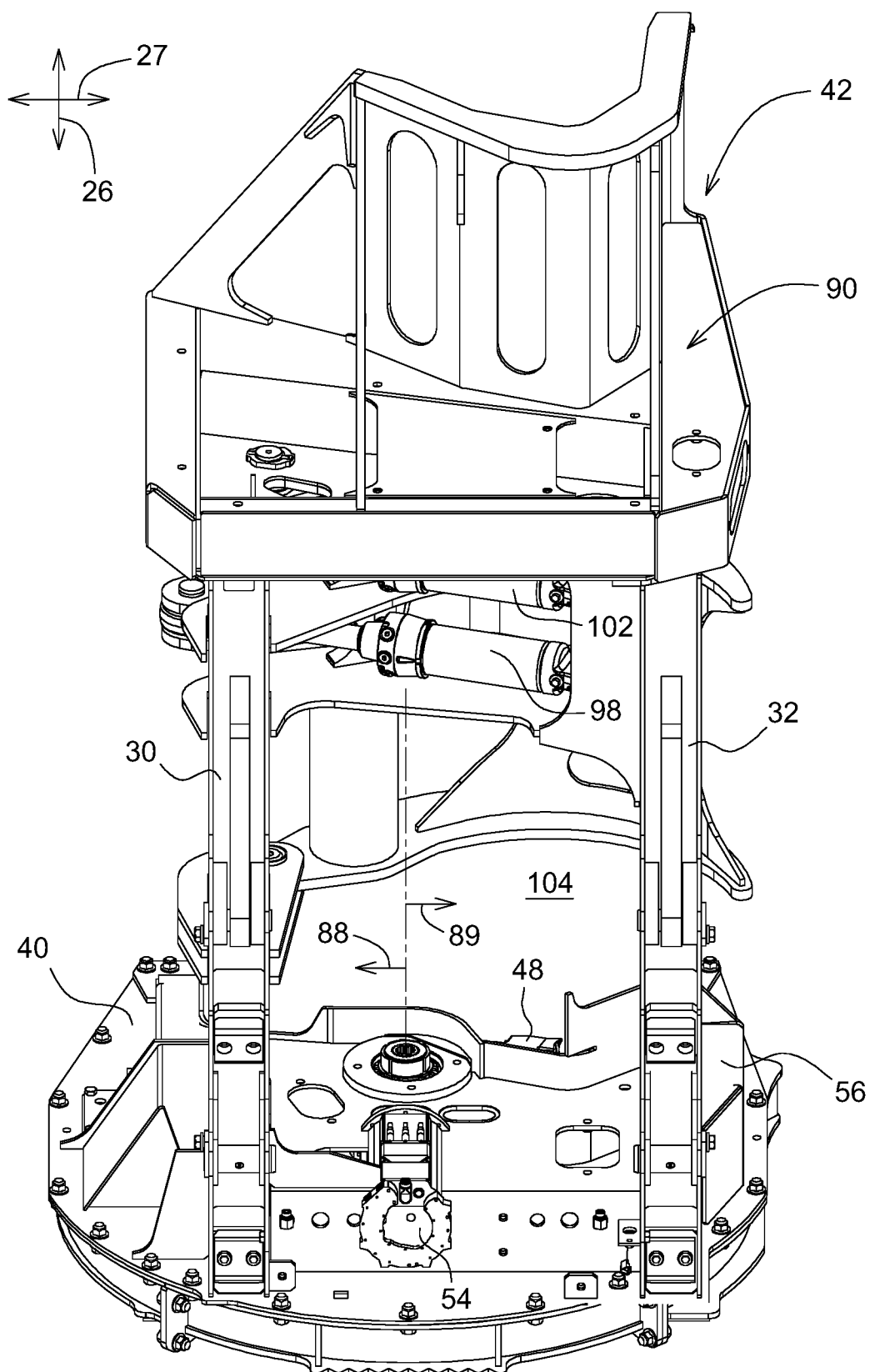
FIG. 3 is a rear view of the disk saw felling head as viewed along the line of sight in FIG. 1 showing the visibility window.

Referring to FIGS. 1 and 3, the head 12 has a fore-aft dimension 25, a lateral dimension 26, and a vertical dimension 27. The fore-aft dimension 25, the lateral dimension 26, and the vertical dimension 27 are perpendicular to one another.

Figure 2:
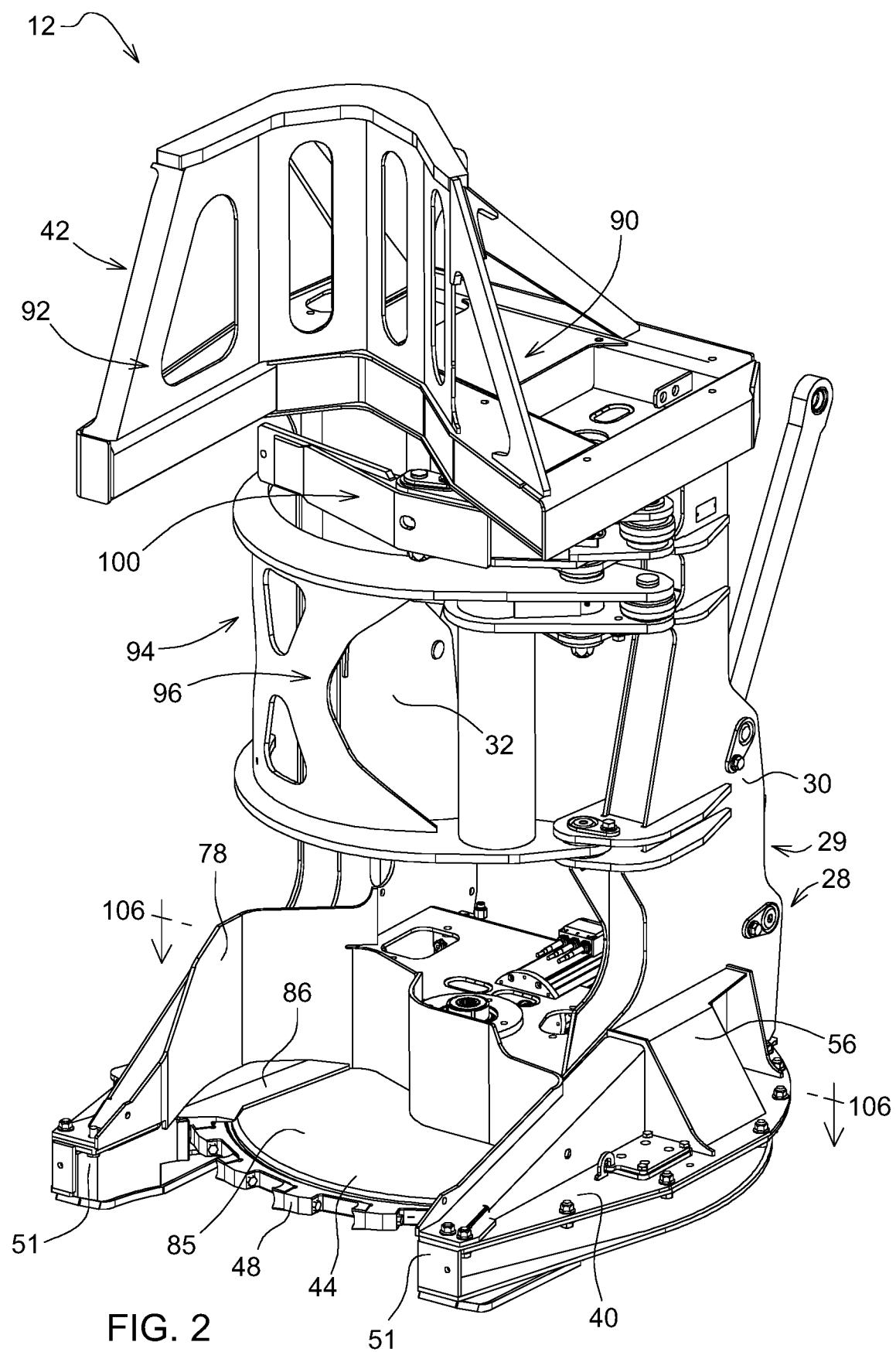
FIG. 2 is a perspective view of the disk saw felling head.

Referring to FIG. 2, the head 12 includes a frame 28. The frame 28 includes a spine 29, which includes a left or first mounting post 30 and a right or second mounting post 32. The first and second mounting posts (30, 32) are configured for attaching the head 12 to the base machine 11 and are spaced laterally apart from one another relative to the lateral dimension 26 of the head 12. The spine 29 and its mounting post 30, 32 extend longitudinally in the vertical dimension 27.

Referring to FIG. 1, the boom 18 includes a left or first boom arm 36 and a right or second boom arm 36. The first boom arm 36 is shown and representative of the second boom arm 36. The first boom arm 36 and the second boom arm 36 are attached pivotally to the front frame 14 and attached pivotally respectively to the first mounting post 30 and the second mounting post 32. The lift cylinders 20 are attached respectively to the boom arms 36.

The pivot linkage 22 includes a left or first link 38 and a right or second link 38, the first link 38 shown and representative of the second link 38. The first link 38 and the second link 38 are attached pivotally, respectively to the first mounting post 30 and the second mounting post 32.

Referring to FIGS. 2-5, the head 12 includes a saw-and-motor section 40 and a horn section 42. The saw-and-motor section 40 is attached to a lower portion of the spine 29. The horn section 42 is attached to an upper portion of the spine 29 above the lower portion relative to the vertical dimension 27 of the head 12.

In the saw-and-motor section 40, the head includes a disk saw 44 configured for felling trees. The disk saw 44 is attached rotatably to, and positioned largely within, a saw housing 56 of the frame 28 so as to be housed within the frame 28 and has cutting teeth 48 spaced around it periphery for cutting through a tree. The disk saw 44 is partially exposed outside the saw housing 56, and thus the frame 28, in a cutting zone 50 of the head 12 at a front of the head 12 relative to the fore-aft dimensions 25 of the head 12.

The saw housing includes a left or first housing extension 51 and a right or second housing extension 51. The cutting zone 50 is defined as an imaginary vertical column relative to the vertical dimension 27, the column extending laterally between the housing extensions 51 relative to the lateral dimension 26. The housing extensions 51 project in front of the disk saw 44 relative to the fore-aft dimension 25 such that the cutting zone 50 is defined between the front of the housing extensions 51 and an imaginary line interconnecting where the disk saw exits the left housing extension 51 and re-enters the right housing extensions 51.

Figure 6:
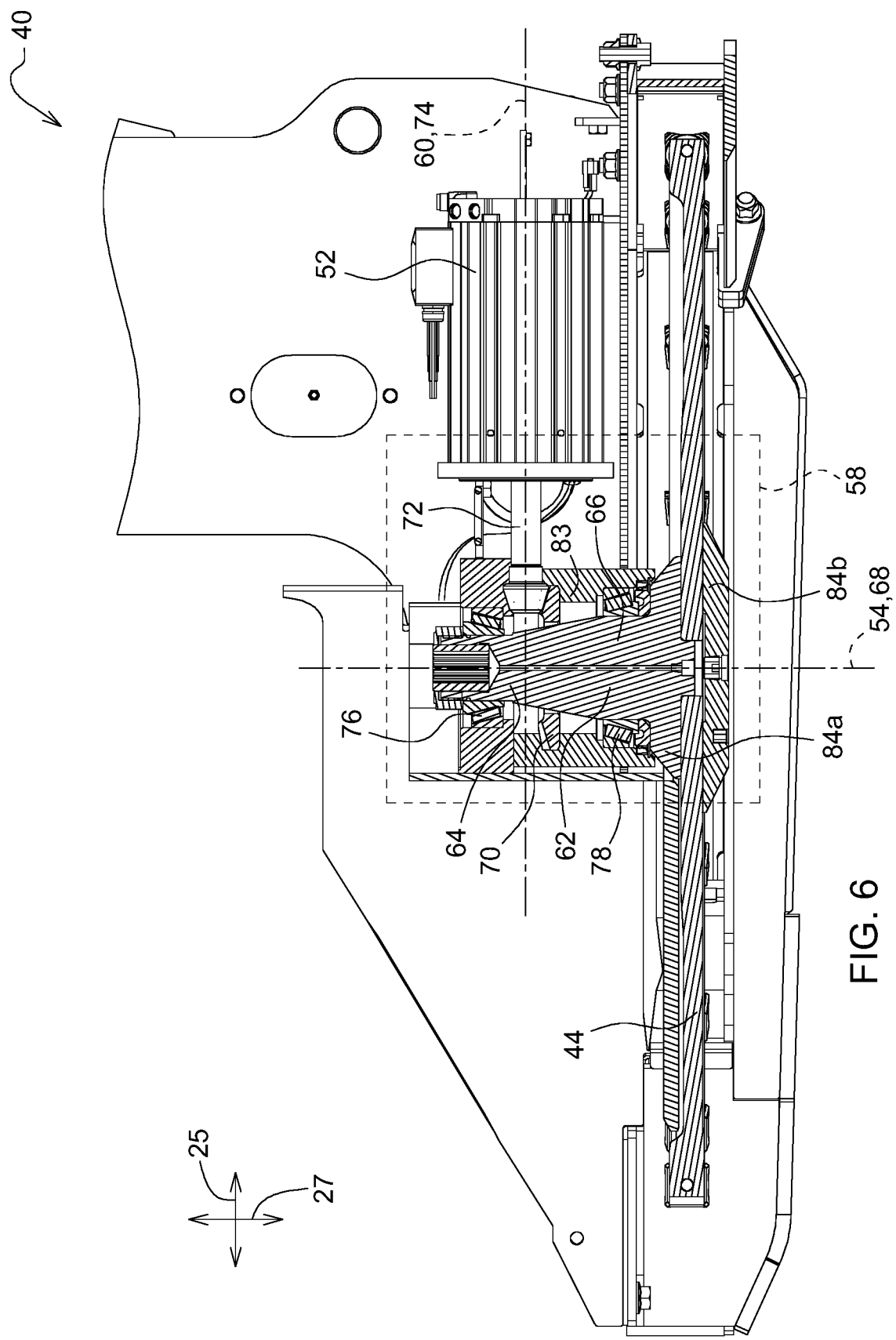
FIG. 6 is a side sectional view of a first embodiment of the disk-saw motor assembly.

Referring to FIG. 6, the saw-and-motor section 40 of the head 12, includes a motor 52. The motor 52 is operatively coupled to the disk saw 44 to rotationally drive the disk saw 44 about a disk saw axis 54 though a coupling assembly 58. The motor axis 60 is perpendicular to the disk saw axis 54. The motor 52 is preferably either electric or hydraulic.

Figure 7B:
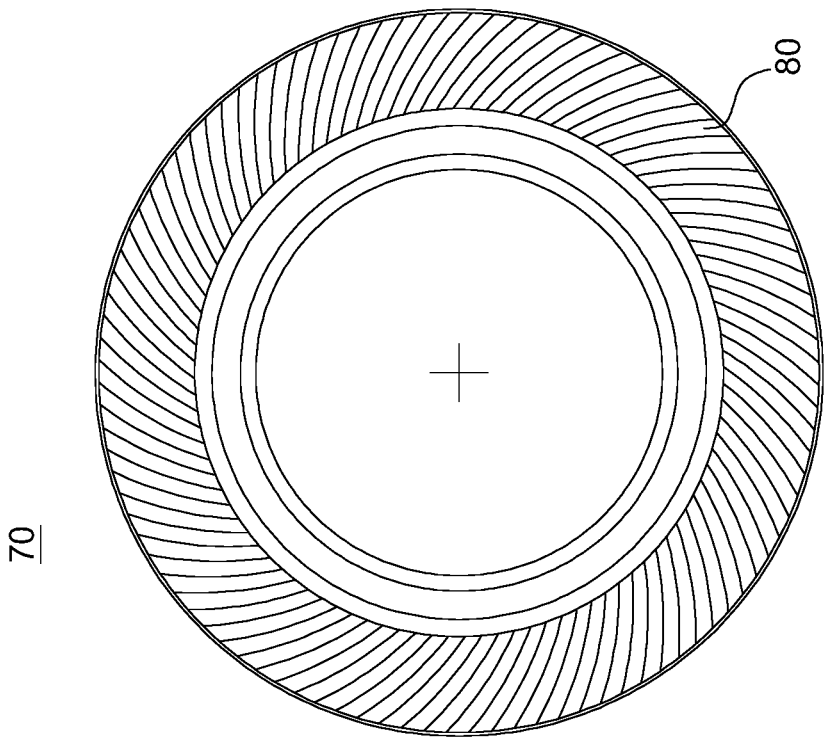
FIG. 7B is a top view of an embodiment of the straight cut bevel gear.
Figure 7A:
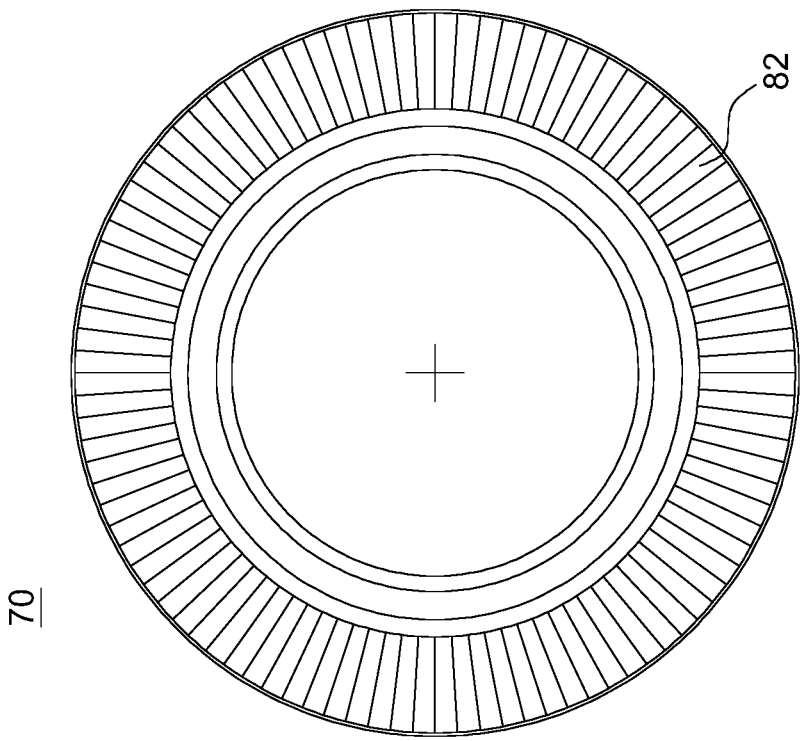
FIG. 7A is a top view of an embodiment of the spiral bevel gear.
Figure 8:
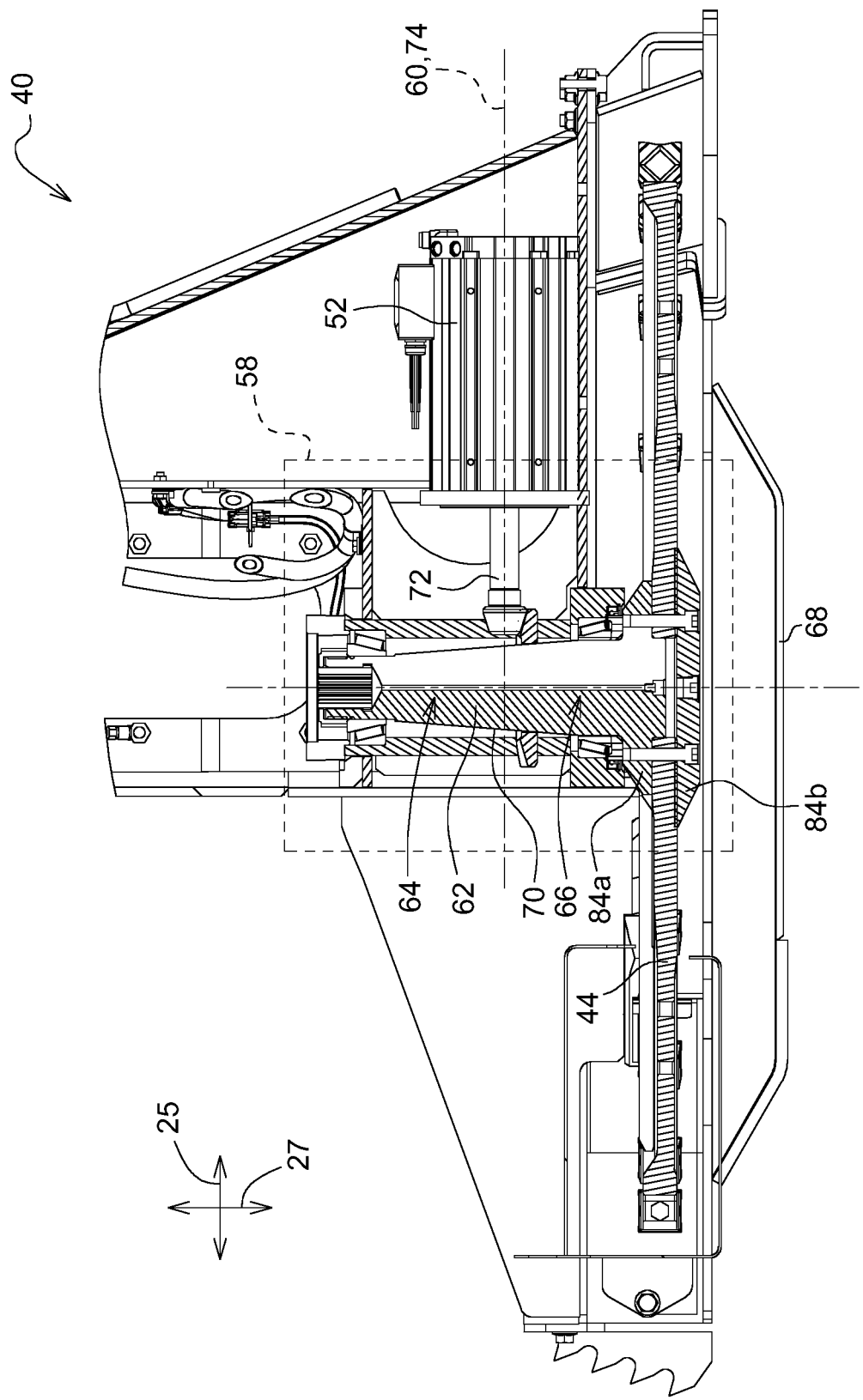
FIG. 8 is a side sectional view of a second embodiment of the disk-saw motor assembly.

The coupling assembly 58 comprises of a mandrel 62 with a first mandrel portion 64, a second mandrel portion 66, and a mandrel axis 68; a bevel gear 70 coupled to the mandrel 62 between the first mandrel portion 64 and the second mandrel portion 66 relative to the vertical dimension 27; and a bevel pinion 72 coupled to the bevel gear 70, the bevel pinion 72 with a pinion axis 74. The mandrel 62 defines portions that are substantially cylindrical with different portions having different diameters. The first mandrel portion 64 is positioned above the second mandrel portion 66 relative to the vertical dimension 27. Placement of the bevel gear 70 between the first mandrel portion 64 and the second mandrel portion 66 provides a rigid positioning of the bevel gear 70 for proper engagement with the bevel pinion 72. That is, because of the cylindrical cross-sections of the mandrel 62 and its general cone-like shape, the bevel gear 70 may naturally settle at a vertical dimension 27, sitting flush where the inner diameter of the bevel gear 70 (shown in FIGS. 7A and 7B) is nearly equal to the cross-sectional diameter of the mandrel 62.

Additionally, as shown in FIG. 6, the mandrel axis 68 is preferably coaxial with the disk saw axis 54. In alternative embodiments, the mandrel axis 68 may be coupled with the disk saw axis 54 wherein the ratio of the rotation of the mandrel 62 about the mandrel axis 68 versus the rotation of the disk saw 44 about the disk saw axis 54 is something other than 1:1 (not shown). That is, in alternative embodiments, the mandrel axis 68 may be offset from the disk saw axis 54, and coupled with a chain (not shown). In the embodiment shown in FIG. 6, the pinion axis 74 is preferably coaxial with the motor axis 60. Similar to the mandrel axis and the disk saw axis, the pinion axis 74 may be coupled to the motor axis 60 wherein the ratio of rotation is something other than 1:1. That is, in alternative embodiments, motor axis 60 may be offset from the pinion axis 74, and coupled with a chain (not shown).

The coupling assembly 58 may further comprise a first plurality of roller bearings 76 coupled to the first mandrel portion 64, and a second plurality of roller bearings 78 coupled to the second mandrel portion 66. The plurality of roller bearings (76, 78) are supported by a mandrel housing 83, wherein the combination of the plurality of roller bearing (76, 78) and mandrel housing 83 provide support for rotation of the mandrel 62 within the mandrel housing 83.

The bevel gear 70 may be of numerous configurations, however is preferably a spiral bevel gear 80 (as shown in 7B) or a straight cut bevel gear 82 (as shown in 7A).

The mandrel 62 may further comprise a first flange 84a and a second flange 84b to mount the saw blade. Rather being a homogenous structure, the mandrel may be operatively coupled to the first flange 84a to which the disk saw 44 is coupled. The disk saw 44 is coupled to the first flange 84a with a second flange 84b. The second flange 84b is operatively coupled to the first flange 84a by a plurality of connectors, such as bolts, to stationary fix the disk saw to the first flange 84a as well as the mandrel 62.

It is important to note that although various coupling assembly configurations exist, the primary advantage is providing a motor 52 with a motor axis 60 operatively coupled to the disk saw 44 to rotationally drive the disk saw 44 about disk saw axis 54 wherein the motor axis 60 is perpendicular to the disk saw axis 54. Because the motor 52 is dimensionally larger along the length of the motor axis 60 as opposed to the motor width, positioning the motor 52 horizontal wherein the motor axis 60 is parallel to a plane in the fore-aft dimension 25 and the lateral dimension 26, and perpendicular to the disk saw axis 54, substantially reduces the hardware required for a disk saw felling head 12. The mandrel's 62 height may also be less than the motor's 52 length. Furthermore, positioning the motor 52 in the manner described above allows the motor 52 to be contained within or partially within the saw housing 56, thereby eliminating common components such as the gearbox and the motor housing. This advantageously provides a reduction in weight of the disk saw felling head 12, and a cost savings for running and manufacturing the equipment. This advantage is in addition to the markedly increased visibility from the operator's station as outlined below.

Figure 4:
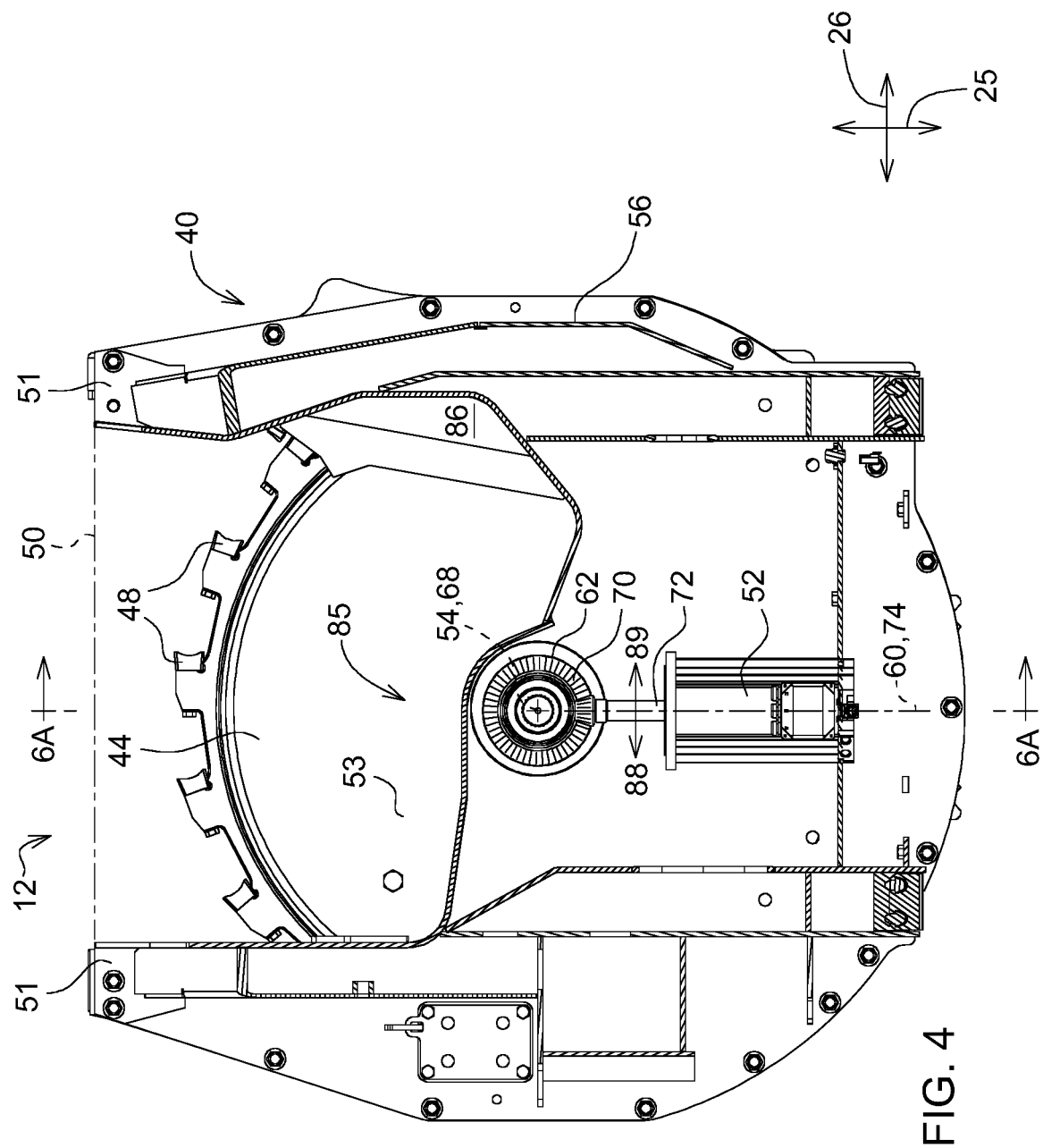
FIG. 4 is a top view of the disk saw felling head.

Now turning to FIGS. 2-4, the saw-and-motor section 40, the frame 28 includes tree-receiving region 85 configured for receiving felled trees once they are felled by the saw 44. The tree-receiving region 85 includes a side accumulation pocket 86 configured for accumulating the felled trees. Due to the pocket 86, the tree-receiving region 85 is rearwardly deeper on a right or second side 89 of the disk saw axis 54 than on an opposite left or first side 88 of the disk saw axis 54 relative to the lateral dimension 26. The pocket 86 is positioned laterally between the disk saw axis 54 and the second mounting post 32 relative to the lateral dimension 26 and could extend laterally beyond the second mounting post 32 relative to the lateral dimension 26.

Referring to FIGS. 2 and 3, in the horn section 42, the frame 28 includes a box platform 90 mounted atop the mounting posts (30, 32) and a horn 92 mounted atop the platform 90. The horn 92 and the box platform 90 are configured so as to facilitate accumulation of felled trees in the pocket 86.

The head 12 includes an arm section 94 positioned between the saw-and-motor section 40 and the horn section 42 relative to the vertical dimension 27. In the arm section 94, the head 12 includes a harvesting arm 96, a harvesting cylinder 98, a bunching arm 100, and a bunching cylinder 102. The arms (96, 100) and the cylinders (98, 102) are positioned between the saw housing 56 and the horn section 42 relative to the vertical dimension 27.

The harvesting arm 96 is attached pivotally to the frame 28 to pivot relative thereto to move a felled tree into the side accumulation pocket 86. The harvesting cylinder 98 is attached pivotally to the mounting post 32 of the frame 28 and the harvesting arm 96 and is operable to pivot the harvesting arm 96 relative to the frame 28.

The bunching arm 100 is attached pivotally to the frame 28 to pivot relative thereto to hold the felled tree(s) in the pocket 86. The bunching cylinder 102 is attached pivotally to the mounting post 32 of the frame 28 and the bunching arm 100 and is operable to pivot the bunching arm 100 relative to the frame 28. The arms (96, 100) are attached pivotally to the frame 28 on the first side 88 of the disk saw axis 54 opposite to the pocket 86 positioned on the second side 89 relative to the lateral dimension 26. In FIG. 3, a solid plate of the frame 28 is cut away from the mounting post to show mounting of the harvesting and bunching cylinders (98, 102 respectively) to the mounting post 32 on the second side 89 of the disk saw axis 54.

During a felling event, operation of the harvesting arm 96 and bunching arm 100 is coordinated in order to receive and accumulate felled trees. The harvesting arm 96 is opened in order to receive a tree onto a butt plate 53 of the tree-receiving region 85 upon felling. The harvesting arm 96 is closed to move the newly felled tree into the pocket 86. Meanwhile, the bunching arm 100 is opened so as to move out and around the newly felled tree with any other felled trees(s) in the pocket 86. The bunching arm 100 is segmented into a first segment attached pivotally to the first segment and spring-biased to an open position relative to the first segment. Such segmentation facilitates bunching of the newly felled tree by the bunching arm 100.

The saw housing is 56 is positioned between the disk saw 44 and the harvesting and bunching cylinders (98, 102 respectively) relative to the vertical dimension 27. The saw housing 56 has a height 106 (also shown in FIG. 5) in the vertical dimension 27, and the saw housing 56 partially defines the visibility window 104 along most of its height 106. The height is measured from the bottom of the housing extension 51, the housing extension being in close proximity to the disk saw 44, to the top wall 108 wherein the mandrel 62 and the motor 52 is housed within.

Figure 5:
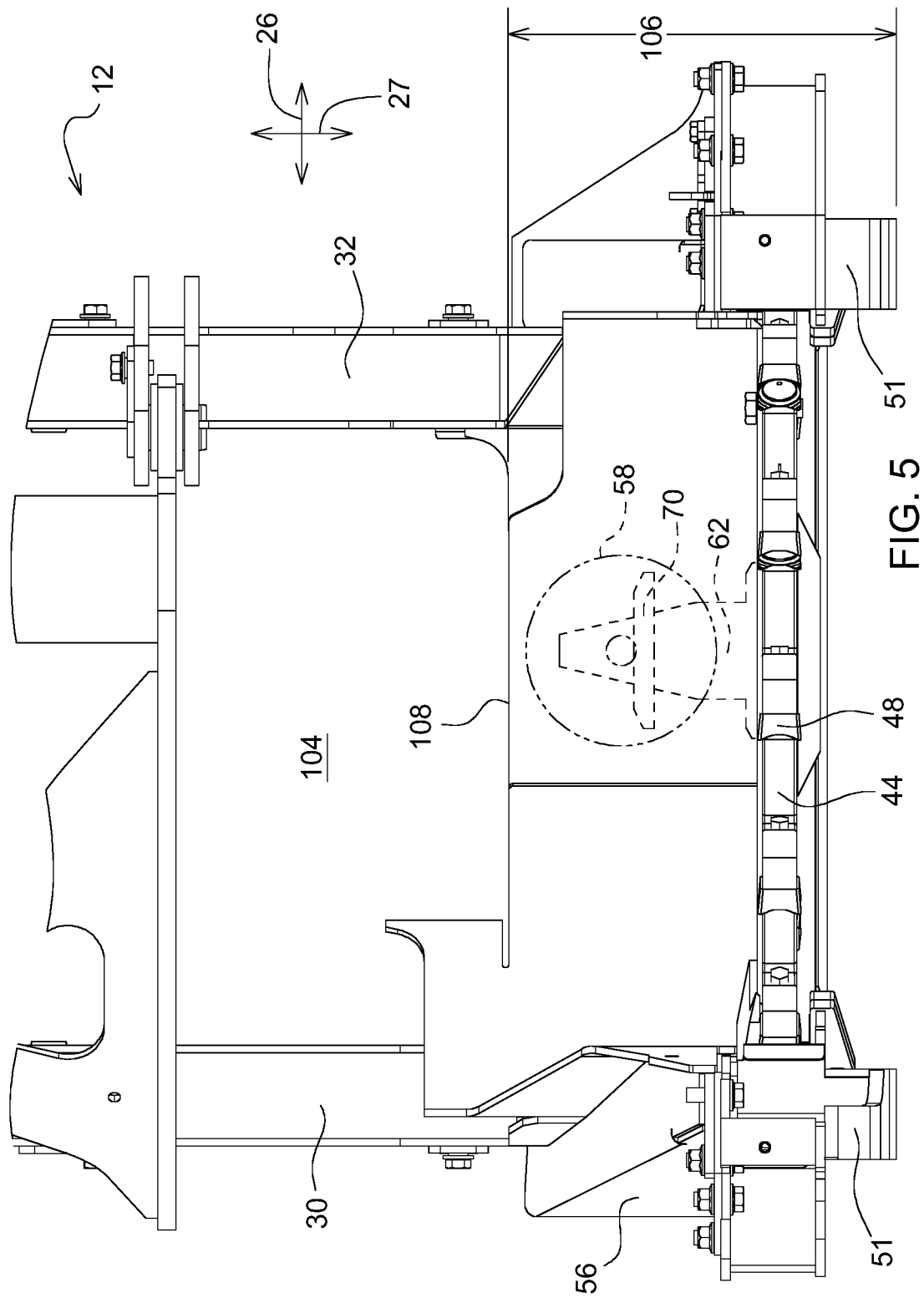
FIG. 5 is a front view showing the visibility window on a side of the saw housing where the cutting teeth of the disk saw are exposed.

The visibility window 104 is constructed so as to promote visibility to the cutting zone 50 (FIG. 4) from the operator's station 16 (FIG. 1). Referring to FIGS. 3 and 5, the visibility window 104 is defined by and between the first mounting post 30, the second mounting post 32, and the saw housing 56 so as to provide a visibility window 104 positioned laterally between a first mounting post 30 and a second mounting post 32 promoting visibility of a full width of a tree through the visibility window 104 toward the cutting zone 50 in a forward direction relative to the for-aft dimension 25. The forward direction along a forward line of sight from the operator's station 16 (FIG. 1) to the cutting zone 50 (FIG. 4) through the visibility window 104. The visibility window 104 further allows a line of sight from the operator's station to the cutting teeth 48 (as shown by the dotted line in FIG. 1) as the cutting teeth 48 engages with trees or vegetation during operation of the forestry vehicle 10. This improved visibility of the trees and vegetation additionally provides a line of sight for tree/vegetation analysis from equipment (e.g. lasers, cameras, moisture sensors, heat sensors, etc.) located on or near the operator station 16.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A disk saw felling head operable by a base machine, the disk saw felling head having a fore-aft dimension, a lateral dimension, and a vertical dimension such that the fore-aft dimension, the lateral dimension, and the vertical dimension are perpendicular to one another, the disk saw felling head comprising:

a frame comprising a spine, a saw housing, and a side accumulation pocket, the spine comprising a first mounting post and a second mounting post, the first and second mounting posts configured for attaching the disk saw felling head to the base machine, the first and second mounting posts spaced laterally apart from one another relative to the lateral dimension, the saw housing positioned laterally between the first and second mounting posts, the side accumulation pocket positioned between the first and second mounting posts relative to the lateral dimension;

a disk saw housed within the frame, the disk saw partially exposed outside the frame in a cutting zone at a front of the disk saw felling head relative to the fore-aft dimension;

a motor with a motor axis operatively coupled to the disk saw to rotationally drive the disk saw about a disk saw axis through a coupling assembly, the motor axis perpendicular to the disk saw axis, the motor positioned within the saw housing;

a harvesting arm attached pivotally to the frame to pivot relative thereto to move a felled tree into the side accumulation pocket;

a harvesting cylinder operable to pivot the harvesting arm relative to the frame;

a bunching arm attached pivotally to the frame to pivot relative thereto to hold the felled tree in the side accumulation pocket;

a bunching cylinder operable to pivot the bunching arm relative to the frame;

the saw housing positioned between the disk saw and the harvesting and bunching cylinders relative to the vertical dimension; and a visibility window positioned laterally between the first mounting post and the second mounting post promoting visibility of a full width of a tree through the visibility window toward the cutting zone in a forward direction relative to the fore-aft dimension.

2. The disk saw felling head of claim 1, wherein the motor is at least one of an electric motor and a hydraulic motor.

3. The disk saw felling head of claim 1, wherein the coupling assembly comprises:
a mandrel with a first mandrel portion, a second mandrel portion, and a mandrel axis,
the first mandrel portion positioned above the second mandrel portion relative to the vertical dimension,
the mandrel axis coaxial with the disk saw axis;
a bevel gear coupled to the mandrel between the first mandrel portion and the second mandrel portion relative to the vertical dimension;
a bevel pinion coupled to the bevel gear, the bevel pinion with a pinion axis, the pinion axis coaxial with the motor axis.

4. The coupling assembly of claim 3, wherein the coupling assembly further comprises:
a first plurality of roller bearings coupled to the first mandrel portion, and
a second plurality of roller bearings coupled to the second mandrel portion.

5. The coupling assembly of claim 3, wherein the bevel gear is at least one of a spiral bevel gear and a straight cut bevel gear.

6. The coupling assembly of claim 3, wherein the mandrel further comprises a flange to mount the disk saw.

7. The disk saw felling head of claim 1, wherein the coupling assembly comprises:
a mandrel rotatively coupled to the disk saw;
a bevel gear coupled to the mandrel; and
a bevel pinion with a first pinion portion and a second pinion portion, the first pinion portion rotatively coupled to the bevel gear and the second pinion portion rotatively coupled to the motor.

8. The disk saw felling head of claim 7, wherein the coupling assembly further comprises a plurality of roller bearings coupled to the mandrel.

9. The disk saw felling head of claim 7, wherein the bevel gear comprises at least one of a spiral bevel gear and a straight cut bevel gear.

10. The disk saw felling head of claim 7, wherein the mandrel further comprises a flange to mount the saw blade.

11. A disk saw felling head operable by a base machine, the disk saw felling head having a fore-aft dimension, a lateral dimension, and a vertical dimension such that the fore-aft dimension, the lateral dimension, and the vertical dimension are perpendicular to one another, the disk saw felling head comprising:
a frame comprising a spine, a saw housing, and a side accumulation pocket, the spine comprising a first mounting post and a second mounting post, the first and second mounting posts configured for attaching the disk saw felling head to the base machine, the first and second mounting posts spaced laterally apart from one another relative to the lateral dimension, the saw housing positioned between the first and second mounting posts, the side accumulation pocket positioned between the first and second mounting posts relative to the lateral dimension;
a disk saw housed within the frame, the disk saw partially exposed outside the frame in a cutting zone at a front of the disk saw felling head relative to the fore-aft dimension;
a motor with a motor axis operatively coupled to the disk saw to rotationally drive the disk saw about a disk saw axis through a coupling assembly, the motor axis perpendicular to the disk saw axis, the motor positioned within the saw housing;
the coupling assembly with a mandrel rotatively coupled to the disk saw, a bevel gear coupled to the mandrel, a bevel pinion with a first pinion portion and a second pinion portion, the first pinion portion rotatively coupled to the bevel gear and the second pinion portion rotatively coupled to the motor;
a harvesting arm attached pivotally to the frame to pivot relative thereto to move a felled tree into the side accumulation pocket;
a harvesting cylinder operable to pivot the harvesting arm relative to the frame;
a bunching arm attached pivotally to the frame to pivot relative thereto to hold the felled tree in the side accumulation pocket;
a bunching cylinder operable to pivot the bunching arm relative to the frame;
the saw housing positioned between the disk saw and the harvesting and bunching cylinders relative to the vertical dimension;
a visibility window positioned laterally between the first mounting post and the second mounting post promoting visibility of a full width of a tree through the visibility window toward the cutting zone in a forward direction relative to the for-aft dimension.

12. A disk saw-motor assembly for a disk saw felling head having a fore-aft dimension, a lateral dimension, and a vertical dimension such that the fore-aft dimension, the lateral dimension, and the vertical dimension are perpendicular to one another, the disk saw felling head further comprising a frame, a saw housing, and a side accumulation pocket, the disk saw-motor assembly comprising:
a disk saw housed within the frame, the disk saw partially exposed outside the frame in a cutting zone at a front of the disk saw felling head relative to the fore-aft dimension;
a motor with a motor axis operative coupled to the disk saw to rotationally drive the disk saw about a disk saw axis through a coupling assembly, the disk saw axis extending in the vertical dimension, the motor axis perpendicular to the disk saw axis, and
the motor positioned within the saw housing.

13. The disk saw-motor assembly of claim 12, wherein the motor is at least one of an electric motor and a hydraulic motor.

14. The disk saw-motor assembly of claim 12, wherein the coupling assembly comprises:
a mandrel with a first mandrel portion, a second mandrel portion, and a mandrel axis,
the first mandrel portion positioned above the second mandrel portion relative to the vertical dimension,
the mandrel axis coaxial with the disk saw axis;
a bevel gear coupled to the mandrel between the first mandrel portion and the second mandrel portion relative to the vertical dimension, a bevel pinion coupled to the bevel gear, the bevel pinion with a pinion axis, the pinion axis of the bevel pinion coaxial with the motor axis.

15. The coupling assembly of claim 14, wherein the coupling assembly further comprises:
a first plurality of roller bearings coupled to the first mandrel portion, and
a second plurality of roller bearings coupled to the second mandrel portion.

16. The coupling assembly of claim 14, wherein the bevel gear is at least one of a spiral bevel gear and a straight cut bevel gear.

17. The disk saw-motor assembly of claim 12, wherein the coupling assembly comprises:
a mandrel rotatively coupled to the disk saw;
a bevel gear coupled to the mandrel; and
a bevel pinion with a first pinion portion and a second pinion portion, the first pinion portion rotatively coupled to the bevel gear and the second pinion portion rotatively coupled to the motor.

18. The disk saw-motor assembly of claim 17, wherein the coupling assembly further comprises a plurality of roller bearings coupled to the mandrel.

19. The disk saw-motor assembly of claim 17, wherein the bevel gear comprises at least one of a spiral bevel gear and a straight cut bevel gear.

20. The disk saw-motor assembly of claim 17, where the mandrel further comprises:
a flange to mount the disk saw.

\* \* \* \* \*